Figures 1, 6:
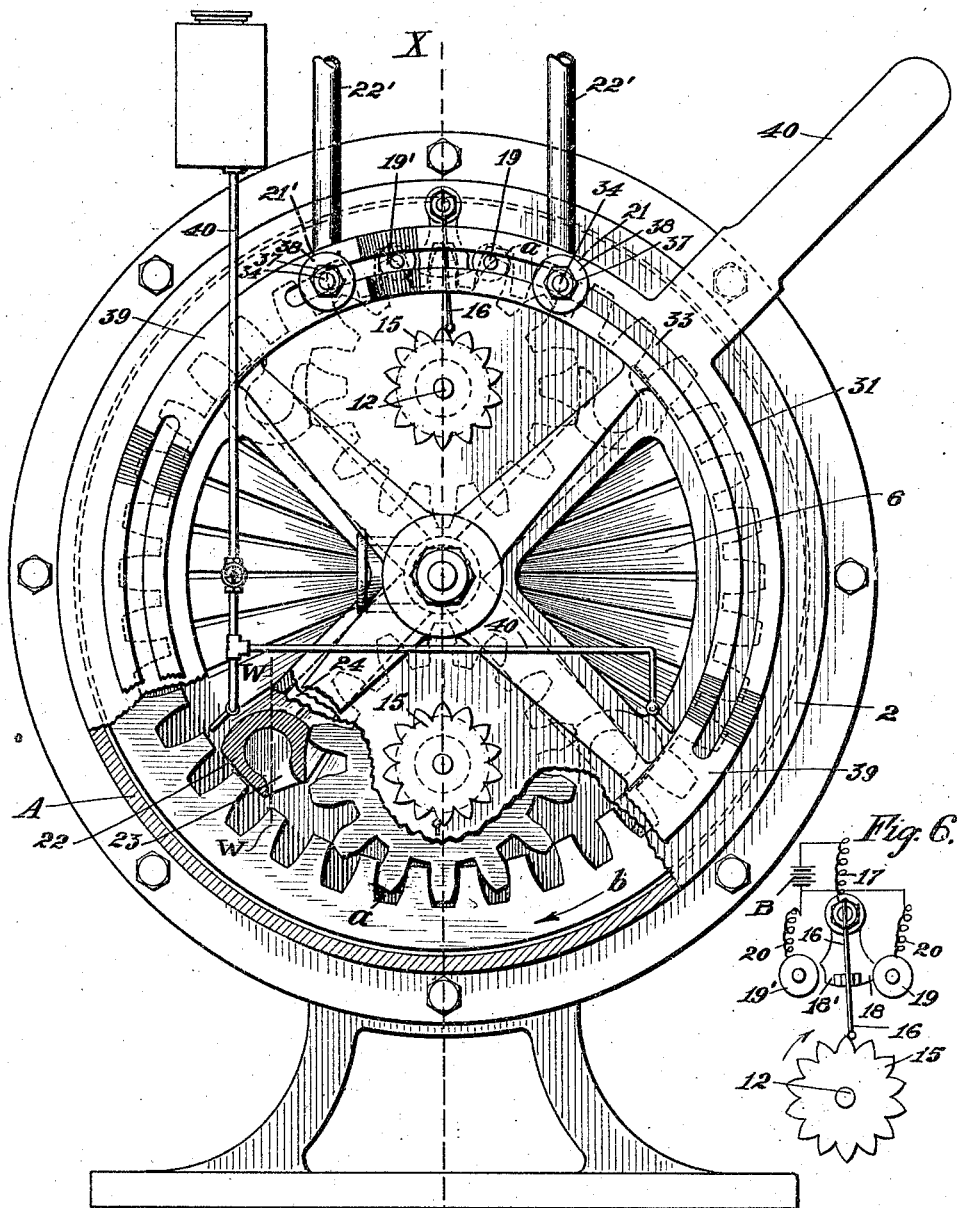

T. J. LOFTUS.
ROTARY FLUID MOTOR.
APPLICATION FILED SEPT. 5, 1911.

1,093,278.

Patented Apr. 14, 1914.
2 SHEETS—SHEET 1.

Witnesses;
R. A. Berry
Thos. Castberg

Inventor
Thomas J. Loftus
By G. H. Strong
Atty.

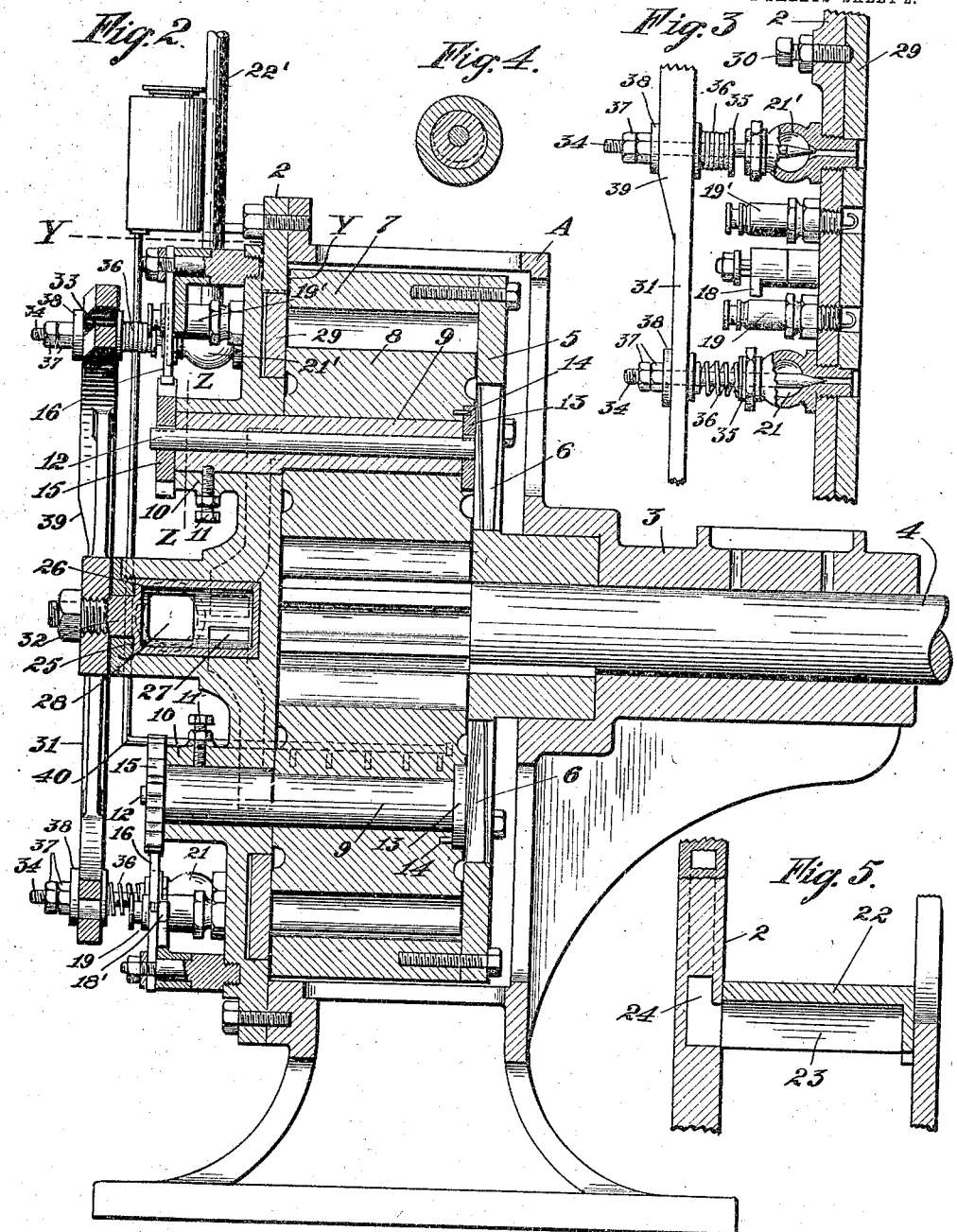

UNITED STATES PATENT OFFICE.

THOMAS J. LOFTUS, OF CASTELLA, CALIFORNIA, ASSIGNOR OF ONE-HALF TO HARMON BELL, OF OAKLAND, CALIFORNIA.

ROTARY FLUID-MOTOR.

1,093,278.          Specification of Letters Patent.     Patented Apr. 14, 1914.

Application filed September 5, 1911. Serial No. 647,550.

*To all whom it may concern:*

Be it known that I, THOMAS J. LOFTUS, citizen of the United States, residing at Castella, in the county of Shasta and State of California, have invented new and useful Improvements in Rotary Fluid-Motors, of which the following is a specification.

This invention relates to a motor and particularly pertains to a motor of the explosive impulse type.

It is the object of this invention to provide a motor in which a shaft to be driven may be rotated at a high and constant speed by means of a series of successive explosive impulses which are directed against the teeth of an internal gear mounted on the shaft.

Another object is to provide a motor having a simple and efficient means for compressing and exploding volatile vapors between intermeshing gear teeth, in such manner as to cause the gears to rotate at high speed; and to provide a simple mechanism by means of which the direction of rotation of the motor can be quickly reversed.

Another object is to provide a rotary motor of the explosive impulse type which is valveless and which is adapted to be mounted direct on the shaft to be driven, and which motor is capable of being operated in any position.

A further object is to provide a motor, which is light, compact and capable of generating high speed and power in proportion to its size and weight.

Other objects will become apparent hereinafter.

The invention consists of the parts and the construction and combination of parts, as hereinafter more fully described and claimed, having reference to the accompanying drawings, in which—

Figure 1 is a front elevation with parts broken away. Fig. 2 is a vertical longitudinal section on the line X—X, Fig. 1. Fig. 3 is a detail horizontal section on the line Y—Y, Fig. 2. Fig. 4 is a section on the line Z—Z, Fig. 2. Fig. 4 is a section on the line W—W, Fig. 1. Fig. 6, Sheet 1, is a detail of the spark timer.

In the drawings, A represents a cylindrical casing which is closed on one end by means of a plate 2 and has a hub 3 formed on its other end centrally thereof. The hub 3 forms a bearing for a shaft 4 which extends into the casing A and has a plate 5 in which a series of fan blades 6 are formed, rigidly mounted on its inner end. An internally toothed gear 7 is attached to the plate 5 in such manner that the shaft 4 and the plate 5 will be rotated when the gear 7 is revolved, as later described.

A pair of pinions 8, revolubly mounted on adjustable shafts 9 supported in hubs 10 formed on the cover 2, mesh with the gear 8 on diametrically opposite sides thereof. The pinions 8 are designed to rotate on the shafts 9, as will be later described, and that portion of each shaft 9 on which the pinion 8 revolves is offset from the portion of the shaft extending into the plate 2 and hub 10, in such manner that by rotating the shaft 9 a short distance the positions of the pinions 8 in relation to gear 7 can be adjusted. This admits of any wear on the gear teeth being taken up so that a close contact between the intermeshing teeth can be maintained.

A set screw 11 is mounted in each hub 10 and bears against the shaft 9 in such manner as to lock the latter against movement. Each shaft 9 is tubular and has a shaft 12 extending lengthwise therethrough. A disk 13 is formed on the inner end of each shaft 12 and, extending beyond the outer periphery of the shaft 9, is attached to the pinion 8 by means of a pin 14, as shown in Fig. 2, in such manner that when the pinion 8 is rotated the shaft 12 will be caused to revolve therewith. Rigidly mounted on the outer end of each shaft 12 adjacent to the hub 10, is a star-wheel 15 which has teeth corresponding in number to the teeth on the pinions 8. The teeth of the star-wheels 15 are designed to actuate a normally vertical plate spring 16, one end of which is rigidly mounted on the outer face of the end plate 2, with the other end extending between the teeth of the star-wheel 15.

The springs 16 are electrically connected to one pole of any suitable source of electrical energy, such as a battery, indicated at B, through a conductor 17 and mounted on opposite sides of the springs and extending some distance therebeyond, are contact plates 18—18′, which are designed to make and break contacts with terminals in a pair of spark plugs 19—19′, the other terminals of which are connected with the other terminals of the battery B through a conductor 20.

The spark plugs 19 are mounted in the end plate 2 and extend therethrough at a point adjacent to the outer ends of the teeth on the pinions 8, where the latter mesh with the teeth of the internal gear 7. A pair of the spark plugs 19 is provided adjacent to each pinion 8 and extends through the end plate 2 on each side of the pinion, as shown in Fig. 2; the sparking points of the plugs 19 being arranged so as to be opposite the space between the teeth of the pinion 8, which are partly in mesh with the teeth on the gear 7.

Means are provided for feeding explosive gases between each of the pinions 8 and the gear 7 in such manner as to be carried forward as the gear and pinions revolve, and be compressed in the spaces between the teeth thereof, which means are here shown as consisting of needle valves 21—21' which are mounted on the end plate 2 to one side of each of the spark plugs 19—19' respectively and are connected by conduits 22' to any suitable source of gas supply under pressure.

In the operation of the invention a pair of needle valves 21—21' are opened so as to permit explosive gases to flow into the space between the pinions 8 and the gears 7 at the point where the teeth of the former are about to traverse into mesh with the teeth of the latter in such manner that, as the gear 7 and pinions 8 revolve, the gases will be compressed between the intermeshing teeth. The moment the teeth of the pinions 8 are about to leave the teeth of the gear 7 the star-wheels 15 act on the springs 16 so as to cause the contact 18 to make and break contact with the spark plug 19, which acts to cause a spark to jump the gap on the inner end of the spark plug in the usual manner. This spark ignites the compressed gases between the teeth of the pinions 8 and gear 7 at a point indicated at $a$. The expansion of the exploding gas acts to drive the pinions 8 and the gear 7 ahead in the direction indicated by the arrows $b$ in Fig. 1; the movement of the gear 7 being transmitted to the shaft 4 through the plate 5.

From the foregoing it will be seen that, as the gear 7 is advanced, there will be a charge of the explosive gas compressed in each space between the teeth of the gear, and that the compressed charges will be successively exploded at the point $a$, as before described; the star-wheel 15 acting on the spring 16 in such manner as to cause the ignition of the gases at this point through the spark plugs 19. The exploded gases are scavenged through barriers 22 arranged on each side of the pinions 8 and which are mounted on the end plate 2 and extend across the gear 7 in slidable contact with the outer ends of the teeth thereof. The barriers 22 also slidably contact the outer faces of the teeth on the pinions 8 and thus prevent the escape of gases at this point, excepting such as may be carried around between the teeth of the pinions 8 on the scavenging side of the pinions.

Each barrier 22 is formed with a longitudinal groove 23 which opens toward the juncture of the pinions 8 with the gear 7 and communicates with a passage 24 formed in the end plate 2 leading to a chamber 25 disposed in the center thereof; a passage 24 leading from each of the barriers. Mounted in the chamber 25 is a revoluble cylinder or drum 26 in which ports 27, adapted to register with the outlets of the passages 24 in the chamber 25, are formed.

The drum 26 is provided with a port 28 which is constantly open to the atmosphere, and this drum 26 is designed to be rotated within the chamber 25 so as to alternately open and close a pair of the passages 24; the passages 24, leading to the barriers 22 on the side of the pinion 8 to which the explosive gases are delivered, being closed to prevent the escape of the gases at this point; these passages being opened to serve as exhaust passages and those previously closed when it is desired to reverse the direction of rotation of the gear 7, as later described.

A metallic packing ring 29 is mounted in an annular groove on the inner face of the end plate 2 and bears against the end faces of the gear 7 and pinions 8, so as to form a tight closure for the outer ends of the spaces between the gear teeth, and thereby confine the gases to the spaces. Set screws 30 are mounted in the end plate 2 and bear against the packing ring 29 and are adapted to be set up so as to keep the packing ring 29 in close contact with the gear 7 and pinions 8.

In the form of the invention here disclosed I have shown a pair of pinions 8. It is manifest, however, that the gear 7 could be rotated in the manner described by the use of a single pinion or by the employment of any number of pinions arranged equally distant apart around the interior of the gear 7. In any event, a pair of spark plugs 19—19' and feed valves 21—21' will be arranged adjacent to each pinion 8, as shown in Fig. 3; the needle valve 21 on one side of the pinion 8 and the spark plug 19' on the other side of the pinion 8 being employed when it is desired to rotate the gear 7 in the direction of the arrow $b$, Fig. 1. The valve 21' and the spark plug 19 are not in operation when the gear 7 is rotated as just described, but when it is desired to reverse the direction of rotation of the gear 7, the valve 21 is closed and the valve 21' is opened so as to direct the explosive gases to the opposite side of the pinions 8. The reversal of the direction of rotation of the pinions 8 reverses the direction of rotation of the star-wheels 15; this reversal acting on the springs 16 in such manner that the contacts 18 will act on the spark plug 19 to explode the gases on the opposite side of the pinions 8, in which case the spark plugs 19′ will be out of commission.

Means are provided by which the valves 21 may be shut off and the valves 21′ may be opened, or vice versa, and the valve drum 26 operated in one operation. This means is here shown as consisting of a wheel 31 rigidly mounted on a stem 32 on the drum 26, the rim of which wheel is slotted at 33, and through which slots the stems of the needle valves 21—21′ extend, as shown in Fig. 3. Mounted on the stem 34 of each needle valve 21—21′ is a collar 35, and wound on the stem between the collar 35 and the wheel rim 31 is a coil spring 36 which acts to normally retain the needle valve in a closed position. The outer end of the valve is threaded to receive nuts 37 which bear against a washer 38 disposed on the stem 34, which washer is adapted to bear against the outer face of the wheel rim 31.

Formed on the outer face of the wheel rim 31 are raised surfaces or cam faces 39, and formed on the wheel rim is a lever handle 40, by means of which the wheel may be given a reciprocating rotary motion, so as to cause the cam faces 39 to pass under the washers 38, and thereby force the valve stems 34 outwardly in opposition to the springs 35 and thereby open the valve; the drum 26 rotating at the same time to close one set of the passages 24 and to open the other set to the exhaust.

It is manifest any other means for delivering and firing an explosive mixture than that here shown may be employed if desired, and that the valves and sparking mechanism are subject to variations.

The speed being so great, the number of explosives will be so numerous that virtually a constant arc may be employed, if desired. The end plate 2 is open between the passages 24, so that when the gear 7 and the plate 5 are revolved, the fan-blades 6 will act to keep a constant circulation of air through the interior of the motor, which acts as a cooling agent. A close contact between the intermeshing teeth is assured by reason of the adjustability of the shafts 9, and as a further preventative of the gases being forced out from between the teeth, and at the same time obviate any danger of back firing between the intermeshing teeth, a coating of oil is applied constantly to the teeth on the gear 7 and pinions 8, by means of an oil feeding mechanism of any suitable construction, here shown as consisting of discharge pipes 40 leading from any suitable source of supply and opening adjacent to the exposed teeth of the gear 7 in such manner as to distribute a filament of oil thereon.

Having thus described my invention, what I claim and desire to secure by Letters Patent is—

1. In a motor of the successive explosion type, having an internal gear and a pinion meshing with said gear, means for delivering an explosive mixture between the teeth of the gear and pinion on one side of the latter to be carried forward by the intermeshing teeth, means for exploding the mixture between the gear and pinion, means for scavenging the burnt gases on the side of the pinion opposite the point of delivery of the explosive mixture, and valve means for directing the explosive mixture to either side of the pinion to govern the direction of rotation of the gear.

2. A motor comprising an internal gear, a pinion meshing with said gear, a casing inclosing the gear and pinion, barriers on the casing arranged on opposite sides of the pinion adjacent the teeth of the gear, and having the surfaces contiguous to the passing teeth curved in arcs to form substantially close joints with the teeth, valves on said casing, and means controlled by said valves for delivering an explosive mixture to the space inclosed by one barrier and opening the space inclosing the other barrier to the atmosphere.

3. A motor comprising an internal gear, a pinion meshing with said gear, a casing inclosing the gear and pinion, barriers on the casing arranged on opposite sides of the pinion adjacent the teeth of the gear, and having the surfaces contiguous to the passing teeth curved in arcs to form substantially close joints with the teeth, valves on said casing, means controlled by said valves for delivering an explosive mixture to the space inclosed by one barrier and opening the space inclosing the other barrier to the atmosphere, and means for exploding the mixture between the meshing teeth of the gear and pinion to cause them to rotate.

4. An internal combustion motor, consisting of a cylindrical case, a centrally journaled revoluble internal gear, a journaled spur gear meshing therewith, annular plates forming joints with the ends of the gear and pinion, means to introduce an explosive mixture between the teeth anterior to a plane intersecting both axis longitudinally, whereby the mixture is compressed between the meshing teeth, means to ignite the mixture as the teeth commence to separate, a hollow transverse barrier located between the teeth at their point of separation to conduct away the products of combustion, an axially located chamber, and an open connection between the barrier and the chamber.

5. An internal combustion motor comprising a cylindrical case having a centrally journaled revoluble internally toothed gear, spur gears journaled in the case and each intermeshing with the teeth of the internal gear, means to form close moving joints at the ends of the gears, means to admit an explosive mixture to be compressed by the approach of the intermeshing teeth, means to ignite the mixture at the instant of greatest compression and when the teeth commence to separate, transverse passages with which the gear teeth form close joints, said passages conducting the exhaust products, and means to open and close the passages when the engine is reversed.

6. In an internal combustion engine of the character described, the combination with an internally toothed gear and spur gears intermeshing with the teeth of the first-named gear, of transverse hollow tubes located at points where the gear teeth separate in their revolution, said tubes having their outer surfaces formed on arcs corresponding with the radii of the teeth, to form close joints therewith and having open slots in the direction from which the teeth approach for the escape of the products of combustion, a centrally located chamber at one end with which the exhaust passages are connected, and a drum with ports adjustable to register with the exhaust to run in either direction.

In testimony whereof I have hereunto set my hand in the presence of two subscribing witnesses.

THOMAS J. LOFTUS.

Witnesses:
  CHARLES EDELMAN,
  MILTON D. EISNER.